(12) United States Patent
Kleiner

(10) Patent No.: US 9,409,369 B2
(45) Date of Patent: Aug. 9, 2016

(54) SIMULTANEOUSLY COLLAPSING AND CONVEYING COLLAPSIBLE CRATES

(71) Applicant: Mordechai Kleiner, Ramat Gan (IL)

(72) Inventor: Mordechai Kleiner, Ramat Gan (IL)

(*) Notice: Subject to any disclaimer, the term of this patent is extended or adjusted under 35 U.S.C. 154(b) by 78 days.

(21) Appl. No.: 14/349,650

(22) PCT Filed: Oct. 3, 2012

(86) PCT No.: PCT/IB2012/055291
§ 371 (c)(1),
(2) Date: Apr. 3, 2014

(87) PCT Pub. No.: WO2013/050937
PCT Pub. Date: Apr. 11, 2013

(65) Prior Publication Data
US 2014/0238819 A1   Aug. 28, 2014

Related U.S. Application Data

(60) Provisional application No. 61/543,820, filed on Oct. 6, 2011.

(30) Foreign Application Priority Data

Oct. 5, 2011   (GB) .................................. 1117086.7

(51) Int. Cl.
*B31B 5/74* (2006.01)
*B65G 15/14* (2006.01)
*B31B 1/00* (2006.01)

(52) U.S. Cl.
CPC ... *B31B 5/74* (2013.01); *B31B 1/00* (2013.01); *B65G 15/14* (2013.01); *B31B 2203/006* (2013.01)

(58) Field of Classification Search
CPC .. B65G 15/14; B65G 2201/0258; B31B 1/30; B31B 1/48; B31B 3/30; B31B 3/48; B31B 5/74; B31B 1/14; B31F 1/0019
USPC ........................................................ 198/345.1
See application file for complete search history.

(56) References Cited

U.S. PATENT DOCUMENTS

| 407,814 | A | 7/1889 | Burdick |
| 2,279,534 | A | 4/1942 | Sidebotham |
| 3,326,096 | A | 6/1967 | Mendoza |
| 4,006,670 | A | 2/1977 | Royal |
| 7,156,222 | B2 * | 1/2007 | Schnuelle ............... B65B 43/14 198/626.3 |

(Continued)

FOREIGN PATENT DOCUMENTS

| GB | 910461 | 11/1962 |
| GB | 1534146 | 11/1978 |
| WO | 2011/055361 | 5/2011 |

*Primary Examiner* — Mark A Deuble
(74) *Attorney, Agent, or Firm* — Rodney J. Fuller; Booth Udall Fuller, PLC

(57) ABSTRACT

A simultaneously collapsing and conveying assembly adapted to collapse constructed collapsible crates along their collapsing lines is provided herein. The collapsing assembly includes a rotating means to rotate the constructed crates by approximately 90° such as to move the open face of the crate from upward facing to forward facing and simultaneously conveying and collapsing means to convey the crates and for applying pressure on the crates' two opposing side panels, as the crates are conveyed, such as to collapse said constructed crates along their collapsing lines.

13 Claims, 9 Drawing Sheets

(56) References Cited

U.S. PATENT DOCUMENTS 7,810,631 B2 * 10/2010 Kawakami ............. A23N 15/12
                                                    198/604

8,562,499 B2 * 10/2013 Costanzo, Jr. ......... B65D 5/241
                                                    493/128

* cited by examiner

SIMULTANEOUSLY COLLAPSING AND CONVEYING COLLAPSIBLE CRATES

RELATED APPLICATION DATA

This application is the U.S. National Stage of International Application No. PCT/IB2012/055291 filed Oct. 3, 2012, which claims priority to Great Britain Patent Application No. 1117086.7 filed Oct. 5, 2011 and claims the benefit of U.S. Provisional Patent Application No. 61/543,820 filed Oct. 6, 2011. Each of the foregoing applications is hereby incorporated by reference in its entirety for all purposes.

FIELD OF THE INVENTION

The invention relates to a method, apparatus and production line for simultaneously collapsing and conveying collapsible crates or boxes, using automated processes in particular.

BACKGROUND OF THE INVENTION

Many types of collapsible packaging crates or boxes are known in the packing industry, as well as many types of production lines for the construction of such packaging crates or boxes.

In WO 2011/055361 is described a continuous production line for manufacturing collapsible crates that enables high speed manufacturability of collapsible (foldable) crates, using automated processes. The crates have high strength characteristics, but are also easy to pack, transport and unfold (re-construct) without requiring the use of any additional securing means at the end user level.

The continuous production line described in WO 2011/055361 comprises a construction assembly for the construction of the collapsible crates, followed by a collapsing assembly to collapse the constructed crates, ready for packing into packing units.

Whilst the construction assembly is continuous and efficient, the process has to come to a complete stop for the collapsing stage of the process. The present invention seeks to overcome this limitation and provides a more efficient collapsing assembly, which provides a simultaneous collapsing and conveying process, thus providing a continuous uninterrupted production line.

It will be understood by the person skilled in the art that the present invention may be used for the continuous production line as described in WO 2011/055361 and also be used for any other suitable production line. Also the crates may be constructed using any other construction assembly and is not limited to the construction assembly as described in WO 2011/055361.

SUMMARY OF THE INVENTION

Hereinafter, is provided an overview of the subject matter disclosed below, it should not be construed, however, as limiting the invention to any features described herein.

The embodiments of the invention are generally directed to a collapsing assembly for simultaneously collapsing and conveying collapsible crates and a method for simultaneously collapsing and conveying collapsible crates.

In one aspect, the present invention comprises a simultaneously collapsing and conveying assembly adapted to collapse constructed collapsible crates along their collapsing lines, said collapsing assembly comprising a rotating means to rotate the constructed crates by 90° such as to move the open face of the crate from upward facing to forward facing, conveying means to convey the crates and collapsing means for applying pressure on the crates' two opposing side panels, as the crates are conveyed past the collapsing means, such as to collapse said constructed crates along their collapsing lines.

In another aspect of the present invention, there is embodied in it a general method for simultaneously collapsing and conveying collapsible crates. The method comprises the steps of continuously feeding the collapsing assembly with constructed crates and within the collapsing assembly, rotating the constructed crates by 90° such as to move the open face of the crate from upward facing to forward facing, conveying the crates and applying pressure on the two opposing side panels, such as to collapse the constructed crates along their collapsing lines.

BRIEF DESCRIPTION OF FIGURES

Examples illustrative of embodiments of the invention are described below with reference to figures attached hereto. In the figures, identical structures, elements or parts that appear in more than one figure are generally labelled with the same number in all the figures in which they appear. Dimensions of components and features shown in the figures are generally chosen for convenience and clarity of presentation and are not necessarily shown to scale.

DETAILED DESCRIPTION OF PREFERRED EMBODIMENTS

In the following description, various aspects of the invention will be described, as well as the collapsible crates and construction assembly as detailed in WO 2011/055361. For the purpose of explanation, specific configurations and details are set forth in order to provide a thorough understanding of the techniques. However, it will be apparent to any person skilled in the art that the techniques may be practiced without specific details being presented herein. Furthermore, well-known features might be omitted or simplified in order not to obscure the descriptive aspects of the techniques.

Figure 1A:
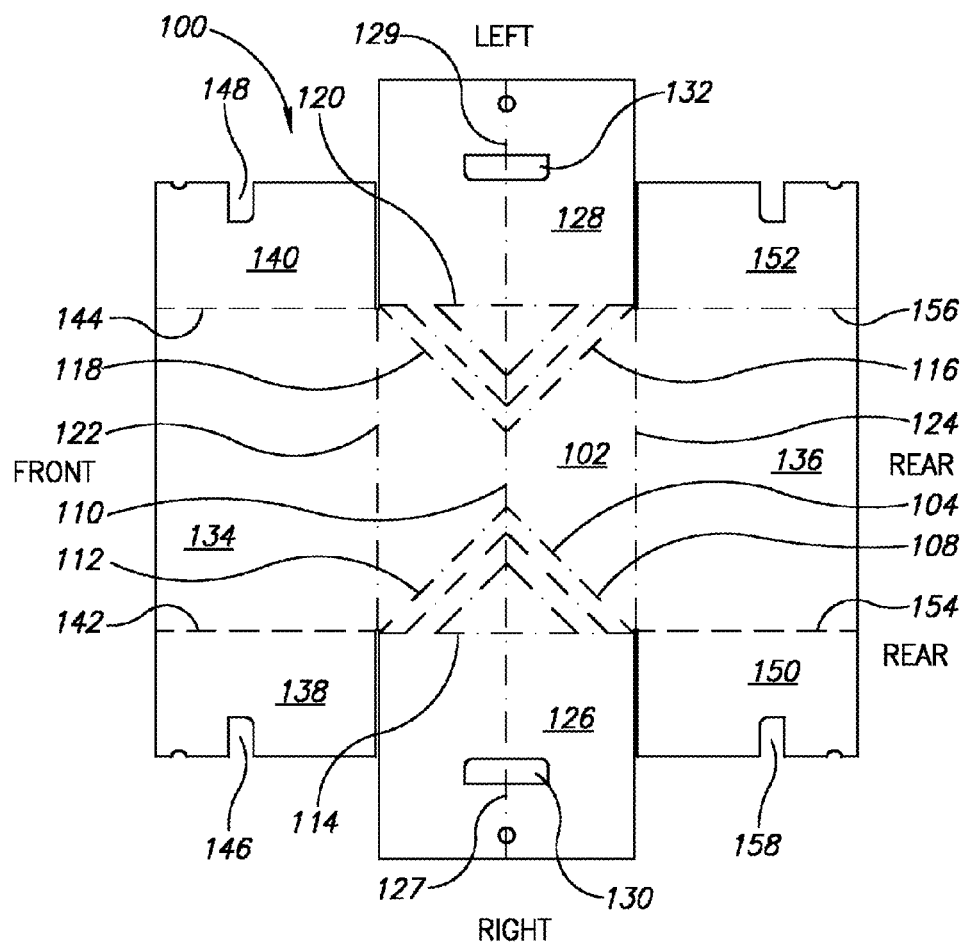
FIG. 1A shows a schematic plan view of a cardboard sheet used to construct a collapsible crate as described in WO 2011/055361.
Figure 1B:
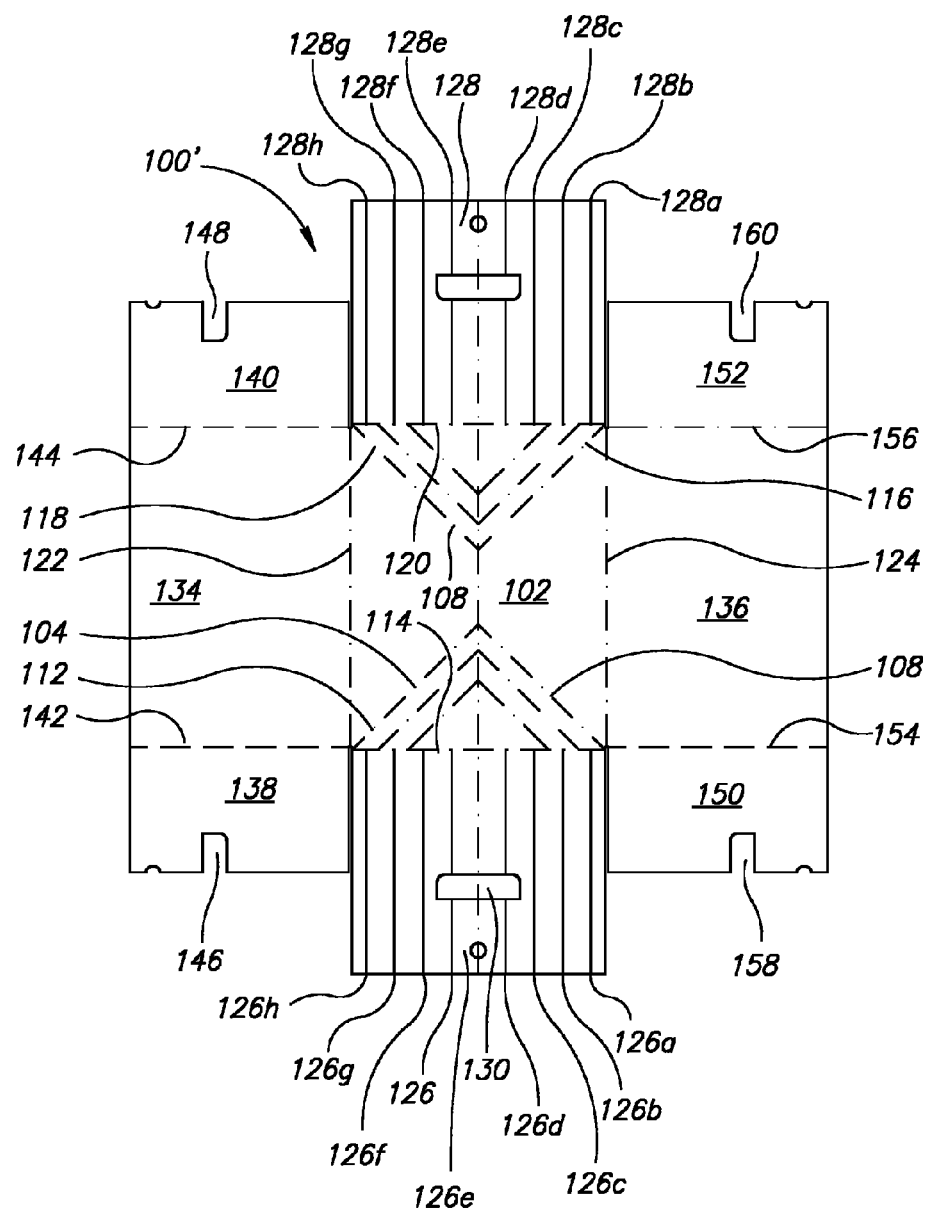
FIG. 1B shows a schematic plan view of a different cardboard sheet used to construct a collapsible crate as described in WO 2011/055361.

Reference is made to FIGS. 1A and 1B that show schematically a plan view of pre-shaped cardboard sheets used to construct collapsible crates as described in WO 2011/055361.

Cardboard sheet 100 includes a bottom panel 102 shown as having an essentially rectangular shape, but can also have various and other different shapes, such as for example, a square. Bottom panel 102 includes four foldable edges: right foldable edge 114, left foldable edge 120, front foldable edge 122 and rear foldable edge 124.

Bottom panel 102 further includes two sets of collapsing lines: right set of collapsing lines 104 and left set of collapsing lines 106. Each one of the sets of collapsing lines right set of collapsing lines 104 and left set of collapsing lines 106 includes three collapsing lines, but may also include any other number of collapsing lines, such as 1, 2, 3, 4 or more collapsing lines. The right set of collapsing lines 104 extends from rear right corner 108 of bottom panel 102 towards a central area 110 of bottom panel 102 "and angle" (at approximately 90 degrees) towards a front right corner 112 of bottom panel 102, such that collapsing lines 104 form a triangle pattern together with right foldable edge 114 of bottom panel 102. Left set of collapsing lines 106 extend from rear left corner 116 of bottom panel 102 towards a central area 110 of bottom panel 102 and angle (at approximately 90 degrees) towards a front left corner 118 of bottom panel 102, such that collapsing lines 106 form a triangular pattern together with left foldable edge 120 of bottom panel 102.

Two opposing side panels, right side panel 126 and left side panel 128 are disposed on the right and left sides of bottom panel 102, along right foldable edge 114 and left foldable edge 120, respectively. Right side panel 126 and left side panel 128 include gripping holes 130 and 132, respectively.

Both right side panel 126 and left side panel 128 are adapted to receive an adhesive material, such as glue, adhesive strips or any other material. The adhesive material might be disposed onto right side panel 126 and left side panel 128 in any form or pattern, for example, as shown in FIG. 1B, along "glue lines" 126*a*, 126*b*, 126*c*, 126*d*, 126*e*, 126*f*, 126*g* and 126*h* and along "glue lines" 128*a*, 128*b*, 128*c*, 128*d*, 128*e*, 128*f*, 128*g* and 128*h*. Part of the glue lines might include "cold glue" (a glue of the type that requires relatively long time for curing) and part of the glue lines might include "warm glue" (a glue that is applied while being in a hot state and cures rapidly upon cooling off).

Two opposing panels, front panel 134 and rear panel 136 are disposed on the front and rear sides of bottom panel 102, along front foldable edge 122 and rear foldable edge 124, respectively. Front panel 134 has two flaps: front right flap 138, disposed along front right (FR) foldable line 142 and front left flap 140 disposed along front left (FL) foldable line 144. Rear panel 136 also has two flaps: rear right flap 150, disposed along rear right (RR) foldable line 154 and rear left flap 152 disposed along rear left (RL) foldable line 156.

Upon unfolding and "constructing" (reassembling) the collapsible crate from cardboard sheet 100, the adhesive material on right side panel 126 is adapted to bind to the back planes (not shown) of front right flap 138 and rear right flap 150; and the adhesive material on left side panel 128 is adapted to bind to the back planes (not shown) of front left flap 140 and rear left flap 152.

In addition, each of front right flap 138 and rear right flap 150 has a recess, namely, recess 146 and recess 158, adapted to align with gripping holes 130 upon constructing (reassembling) the collapsible crate from cardboard sheet 100, and thus enables the user of the crate to insert his/her hands into the holes in order to carry it. Similarly, each of front left flap 140 and rear left flap 152, has a recess, namely, recess 148 and recess 160, adapted to align with gripping holes 130 upon construction of the collapsible crate from cardboard sheet 100.

Right side panel 126 includes collapsing line 127, located approximately in the centre thereof, essentially perpendicular to foldable edge 114.

Left side panel 128 includes collapsing line 129, located approximately in the centre thereof, essentially perpendicular to left foldable edge 120.

Figure 2:
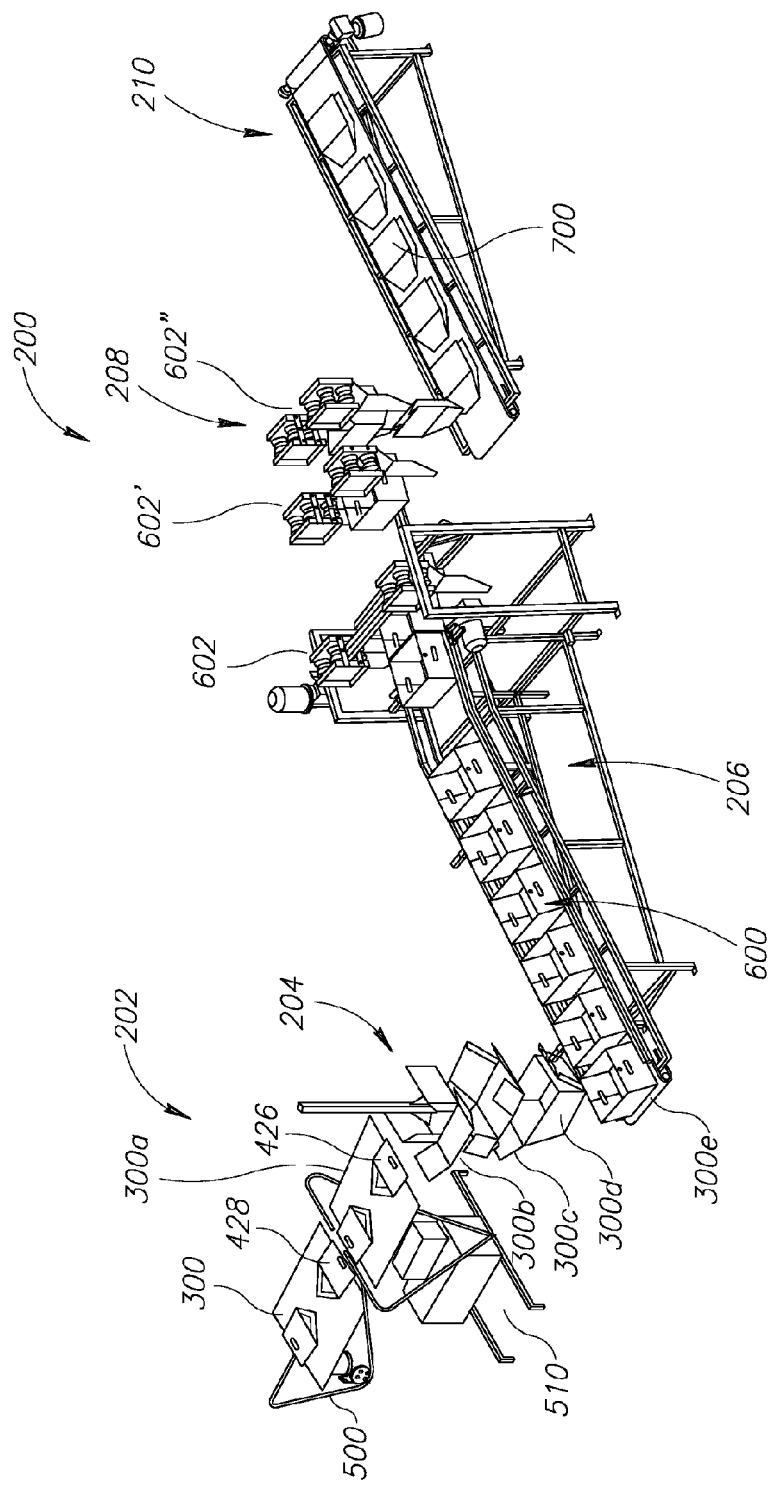
FIG. 2 shows a schematic view of a manufacturing line of collapsible crates, including the construction assembly as described in WO 2011/055361.

Reference is now made to FIG. 2 that shows schematically a manufacturing line 200 of collapsible crates (such as crates manufactured from pre-shaped cardboard sheets as described hereinabove while referring to FIGS. 1A and 1B.

Manufacturing (production) line 200 includes three assemblies: preliminary (introduction or input end) assembly 202, construction assembly 204 and a first conveyor assembly 206. Manufacturing line 200, might be a continuous manufacturing line.

The continuous manufacturing line, might be a production line that includes two or more production units (assemblies), wherein the product of one such unit (assembly) is sequentially transferred to another unit (assembly) of the manufacturing line 200 for further treatment.

The production assemblies may be adjacent one to the other. The product of one assembly may be transferred to another assembly in a continuing (advancing) operation and essentially without delay.

Preliminary/input end assembly 202 is used for feeding the line with cardboard sheets (such as cardboard sheet 100 of FIG. 1) that are used in the construction of the collapsible crates. As seen in FIG. 2, cardboard sheet 300 (which is similar to cardboard sheet 100 of FIG. No. 1) is introduced into manufacturing line 200, using, preferably, motor 500 (or optionally any other means). Cardboard sheet 300*a* is shown in an already further advanced point in the manufacturing line 200 than cardboard sheet 300. Preliminary (Input End) assembly 202 also includes glue pump 510 (cold and/or warm glue) and glue dispenser 520 adapted, for example, to apply glue (cold and/or warm), according to a predetermined pattern, on right side panel 426 and left side panel 428 of cardboard sheet 300*a* (similar to right side panel 126 and left side panel 128 of cardboard sheet 100 of FIG. No. 1). The application of glue might be performed during the progression of the cardboard sheets towards construction assembly 204.

After the application of glue, the cardboard sheets are moved to construction assembly 204 which is adapted to fold and assemble (such as connect, glue, tape or the like) the cardboard sheets (such as cardboard sheets 300*a*, 300*b*, 300*c*, 300*d* and 300*e*) so as to form the constructed crates 600, having the desired design and strength. Detailed view of preliminary/input end assembly 202 and construction assembly 204 is found in FIG. 3, hereinbelow.

Figure 3:
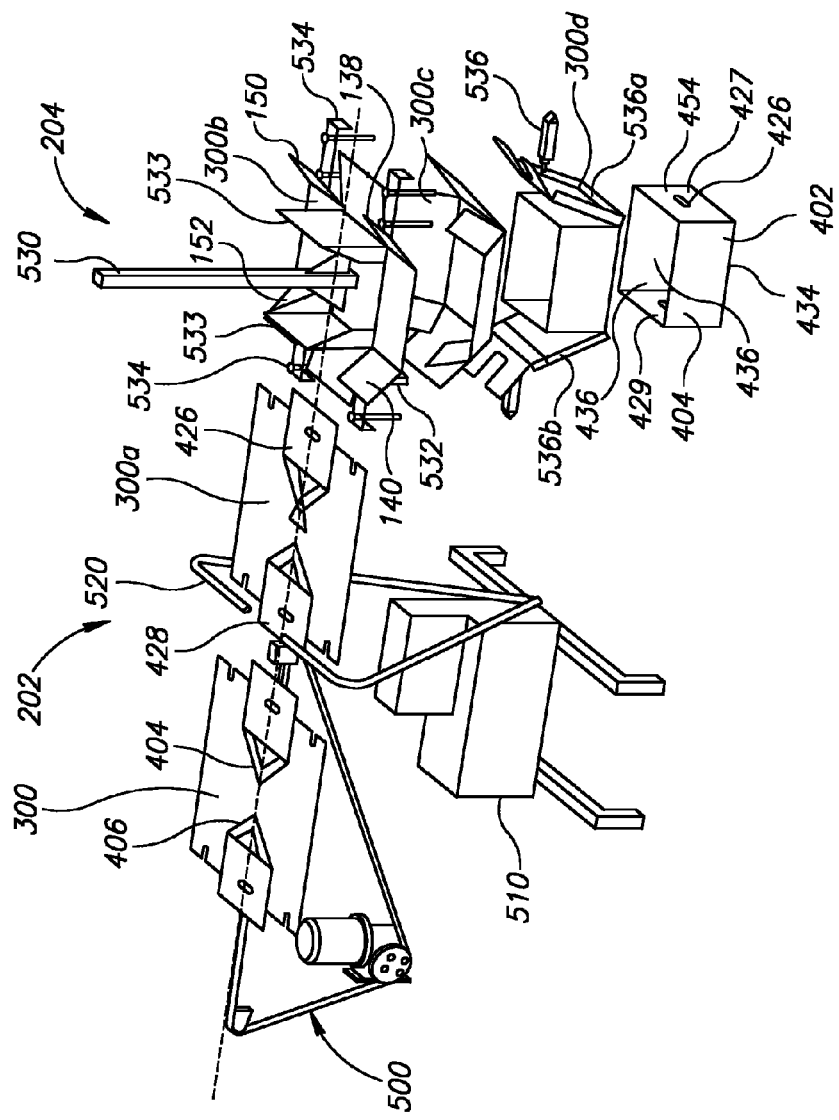
FIG. 3 shows a schematic view that presents a part of a manufacturing line of collapsible crate, as described in WO 2011/055361.

FIG. 3 shows a closer view of preliminary (input end) assembly 202 and construction assembly 204 of manufacturing line 200 shown in FIG. 2. Cardboard sheet 300 (which is similar to cardboard sheet 300 of FIG. 2 and to cardboard sheet 100 of FIG. 1) is inserted/fed into manufacturing line 200 (not fully shown), using motor 500 (or optionally any other means). Cardboard sheet 300*a* is shown already at a further advanced stage in the manufacturing line than cardboard sheet 300. Preliminary/Input End assembly 202 also includes glue pump 510 (cold and/or warm glue) and glue dispenser 520 adapted to apply glue (cold and/or warm), for example, according to a predetermined pattern, on right side panel 426 and left side panel 428 of cardboard sheet 300*a* (similar to right side panel 126 and left side panel 128 of cardboard sheet 100 of FIG. 1), wherein the arrow on cardboard sheet 300a indicates the direction of the progression of the cardboard sheets. The application of glue might be performed during the progressing run of the cardboard sheets towards construction assembly 204.

After the application of the glue, the cardboard sheets are moved to construction assembly 204 which is adapted to fold and glue the cardboard sheets (such as cardboard sheets 300 and 300a) so as to form the constructed crates 600, having the desired design and strength. Cardboard sheet 300b is showing within construction assembly 204 when pressing device (or in other word—plunger) 530 presses downwards against bottom panel 102b (not shown). Pressing device 530 comprises a bottom platform 532 and two side platforms 533 essentially perpendicular to bottom platform 532.

Pressing device 530 is adapted to linearly move in a downwards direction while pressing bottom platform 532 against bottom panel 102b of cardboard sheet 102b.

Pistons 534, located in the vicinity of front right flap 138b, front left flap 140b, rear right flap 150b and rear left flap 152b, are adapted to push front right flap 138b, front left flap 140b, rear right flap 150b and rear left flap 152b upwards in a direction opposing the pressing direction of pressing device 530 to conform cardboard sheet 300b to the crate shape dictated by crate model 532.

Cardboard sheet 300c is depicted after compressing and fitting the flaps. Cardboard sheet 300d shows the next step, which can also be performed simultaneously with the previous step (compression and fitting), that includes pushing the back surfaces of right side panel 426 and left side panel 428 towards the centre of the crate and tightening the glue. This is being performed by tightening device 536.

Professionals in the field will recognize that a rather characteristic feature of construction assembly 204 is that it reconstructs the crate while implementing a continuance downwards directed movement of pressing device (plunger) 530 that continually engages the pre-fabricated and already glue-applied cardboard sheet.

The result is, the crate, shown as constructed crate 300e. Constructed crate 300e includes: bottom panel 402 (similar to bottom panel 102 of FIGS. 1A and 1B), having right set of collapsing lines 404 and left set of collapsing lines 406 (not shown, but are similar to right set of collapsing lines 104 and left set of collapsing lines 106 of FIGS. 1A and 1B), front panel 434 and rear panel 436 (similar to front panel 134 and rear panel 136 of FIGS. 1A and 1B), right side panel 426 and left side panel 428, rear right (RR) foldable line 454 (similar to rear right (RR) foldable line 154 of FIGS. 1A and 1B), rear left (RL) foldable line 456 (similar to rear left (RL) foldable line 154 of FIGS. 1A and 1B), front right (FR) foldable line 442 (similar to front right (FR) foldable line 142 of FIGS. 1A and 1B), and front left (FL) foldable line 444 (similar to front left (FL) foldable line 144 of FIGS. 1A and 1B).

The constructed crates are then transferred by first conveyor assembly 206 to the collapsing assembly 208, according to the present invention. The collapsing assembly is adapted to collapse the constructed crates 600 and to convert them into collapsed crates 700.

Figure 4A:
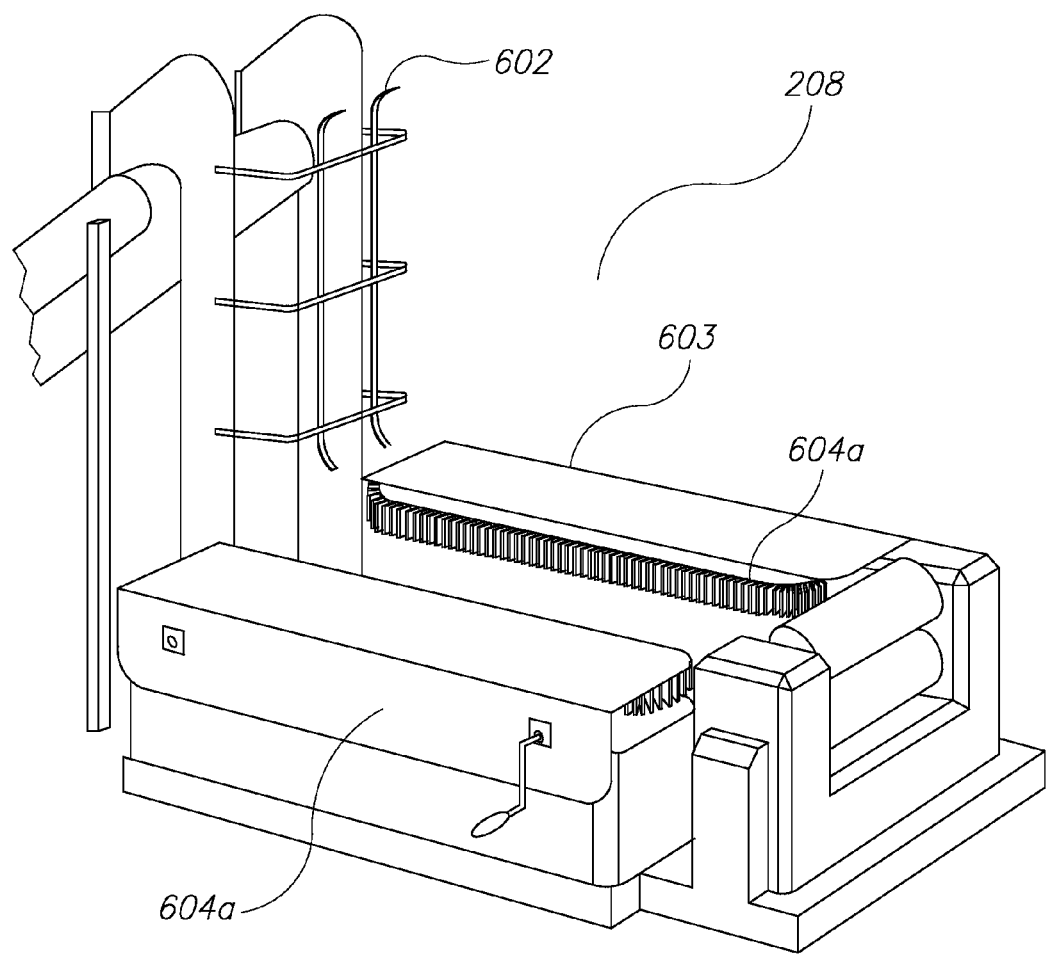
FIG. 4a shows a schematic view that presents a part of a manufacturing line of collapsible crates, in accordance with an embodiment of the present invention.

FIG. 4a shows a view of the collapsing assembly according to one aspect of the present invention.

Collapsing assembly 208 includes a rotating means 602 and simultaneously conveying and collapsing means 603, adapted to exert a pressure on the collapsing lines of the collapsible crates.

The rotating means 602, rotates the constructed crate 600 by 90° such as to move the open face of the crate from upward facing to forward facing towards the direction of conveyance. The crate 600 is then conveyed towards the collapsing and conveying means 603. The collapsing and conveying means, according to one aspect of the invention, includes a tunnel 604a fitted with a plurality of fins 604b on its opposing substantially upright (vertical) internal walls such that the fins are substantially horizontal.

Figure 4B:
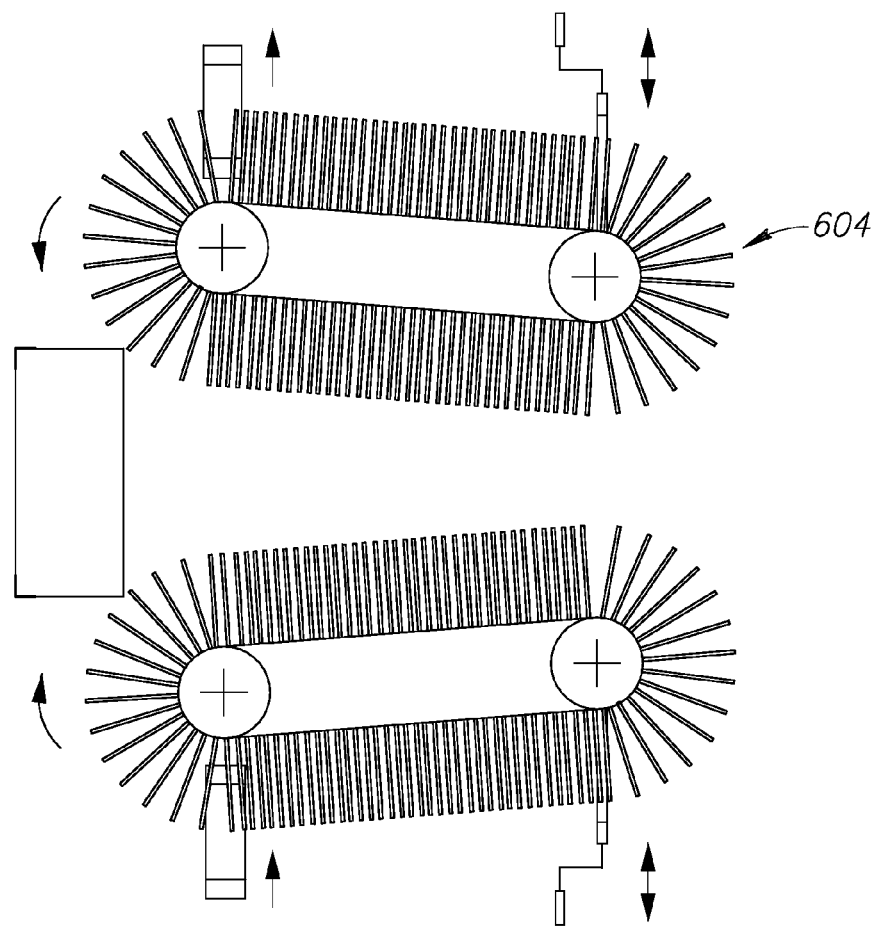
FIG. 4b shows a plan view of the collapsing and conveying means of the present invention.

As can be seen in FIG. 4b, the fins 604b are provided on rotating spindles such that they rotate in opposite directions. As the crate 600 is conveyed towards the tunnel 604a, the edges of a pair of fins contact with the collapsing lines of the crate 600 and exert a pressure on the collapsing lines as the crate is conveyed through the tunnel 604a, so as to collapse the crate 600. The crate 700, exiting the tunnel, is in its collapsed form. The two sets of fins are provided such that they are set at an angle towards each other, such that the entrance to the tunnel is wider at the entrance than the exit.

Figure 4C:
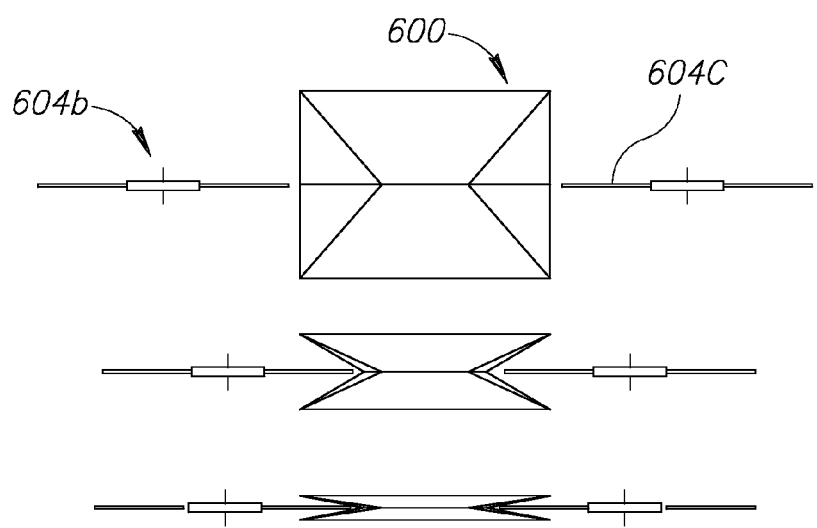
FIG. 4c shows a front view of the crate as it is conveyed and collapsed by the collapsing and conveying means of the present invention.

FIG. 4c shows a front view of the crate as it is collapsed and conveyed through the collapsing and conveying means 603. As can be seen, two opposing fins contact the collapsing lines of the crate and as the fins are rotated around the spindles, the crate is simultaneously conveyed and collapsed.

Figure 5A:
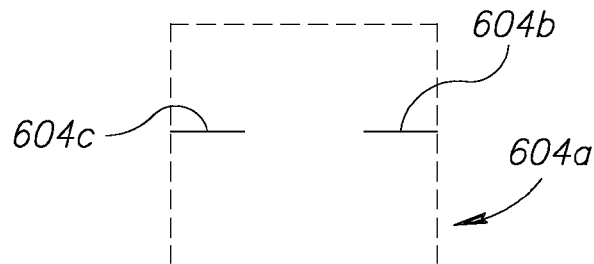
FIGS. 5a-5e shows a schematic view of various additional embodiments of the present invention.

FIG. 5a shows a further embodiment of the tunnel 604a and two fins 604b, 604c1. Here, separate conveying means are provided to convey the crate past the collapsing means. The tunnel may be constructed of any substantially rigid material, such as sheet metal. The tunnel, here, is shown as substantially rectangular but may be for example, square in shape. The fins may also be constructed of any substantially rigid material, such as sheet metal, which is able to exert a collapsing force of the collapsing lines of the constructed crate 600.

Figure 5B:
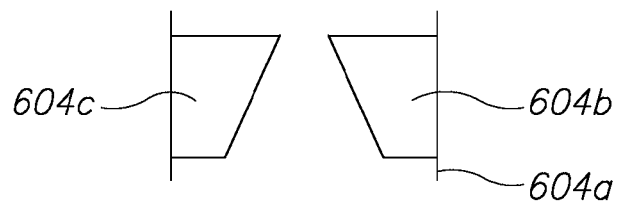

FIG. 5b is a plan view of the inside of the tunnel 604a and the fins 604b, 604c. As can be seen, the fins 604b, 604c are tapered such that the entrance to the tunnel is at its widest to enable the constructed crate to enter the tunnel 604a. As the crate is conveyed into the tunnel 604a, the fins 604b, 604c contact the collapsing lines of the crate 600 and start to exert a collapsing force on the collapsing lines. In this manner, as the crate 600 is conveyed through the tunnel, the crate 600 collapses along its collapsing lines.

Figure 5C:
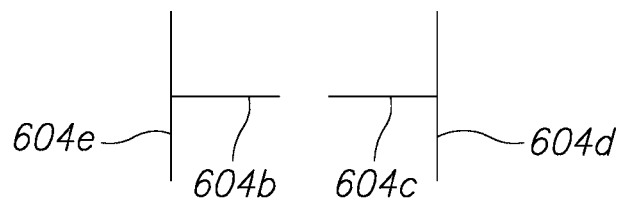
Figure 5C:
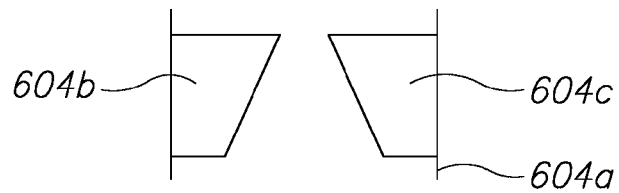

FIG. 5c shows another embodiment of the collapsing means. Here, two substantially upright (vertical) panels 604d, 604e are attached to the outer edges of the conveying mechanism. The panels 604d, 604e are fitted with fins 604b, 604c, such as those fitted on the internal opposing walls of the tunnel. The fins 604b, 604c are again tapered such that they contact the collapsing lines of the crate 600, so as to exert a force thereon as the crate is conveyed past the collapsing means.

Figure 5D:
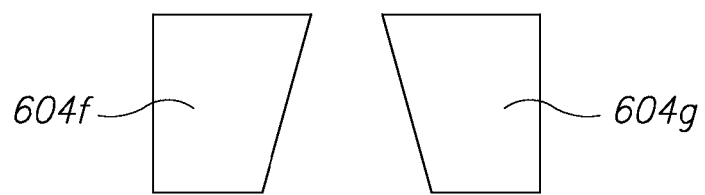

FIG. 5d shows yet another embodiment of the collapsing means. Here the collapsing means 604 comprises two members 604f, 604g, bent at right angles, with their substantially upright (vertical) parts attached to the outer edges of the conveying mechanism and their substantially horizontal parts facing each other across the conveying mechanism. The horizontal parts 604h, 604i are again tapered so as to contact the conveyed crate along its collapsing lines such as to exert a force thereon and collapse the crate.

Figure 5E:
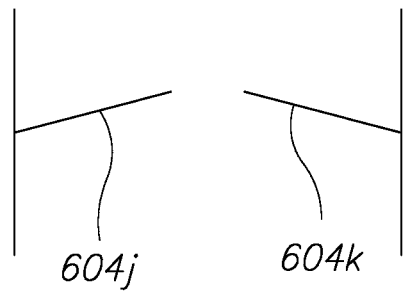
Figure 5E:
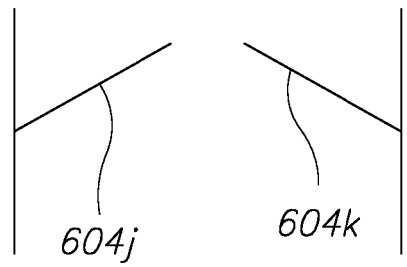

FIG. 5e shows a further embodiment of the collapsing means 604. Here, the collapsing means 604 comprises two substantially rigid members 604j, 604k attached to upright panels which in turn are attached to the outer edges of the conveying mechanism. The rigid members 604j, 604k are slanted towards each other such that as the crate 600 is conveyed towards the collapsing means, the collapsing lines of the crate 600 are contacted therewith.

In all the embodiments described above, the pressure may be applied by collapsing fin 604b on right side panel 426 along collapsing line 427 (similar to collapsing line 127 of FIGS. 1A and 1B), located approximately between (and parallel to), rear right (RR) foldable line 454 and front right (FR) foldable line 442 and collapsing fin 604*c* on left side panel 428 along collapsing line 429 (similar to collapsing line 129 of FIGS. 1A and 1B), located approximately between (and parallel to) rear left (RL) foldable line 456 and front left (FL) foldable line 444. According to yet another embodiment, the pressure may be applied by collapsing fin 604*b* on right side panel 426 along collapsing line 427 and by collapsing fin 604*c* on left side panel 428 along collapsing line 429.

Upon application of such pressure, constructed crate 600 (similar to constructed crate 300*e* of FIG. 3) collapses along collapsing lines 427 and 429, so that collapsing lines 427 and 429 are pushed towards one another, rear right (RR) foldable line 454 and front right (FR) foldable line 442 are brought together, essentially parallel and adjacent to each other and rear left (RL) foldable line 456 and front left (FL) foldable line 444 are also brought together, essentially parallel and adjacent to each other. Upon collapsing, front panel 434 and rear panel 436 are also brought together essentially overlapping each other, and bottom panel 402 folds downwards (and outwards), along right set of collapsing lines 404 and left set of collapsing lines 406. The collapsed crate is labelled as collapsed crate 700 (shown in detail, in FIG. 6).

Figure 6:
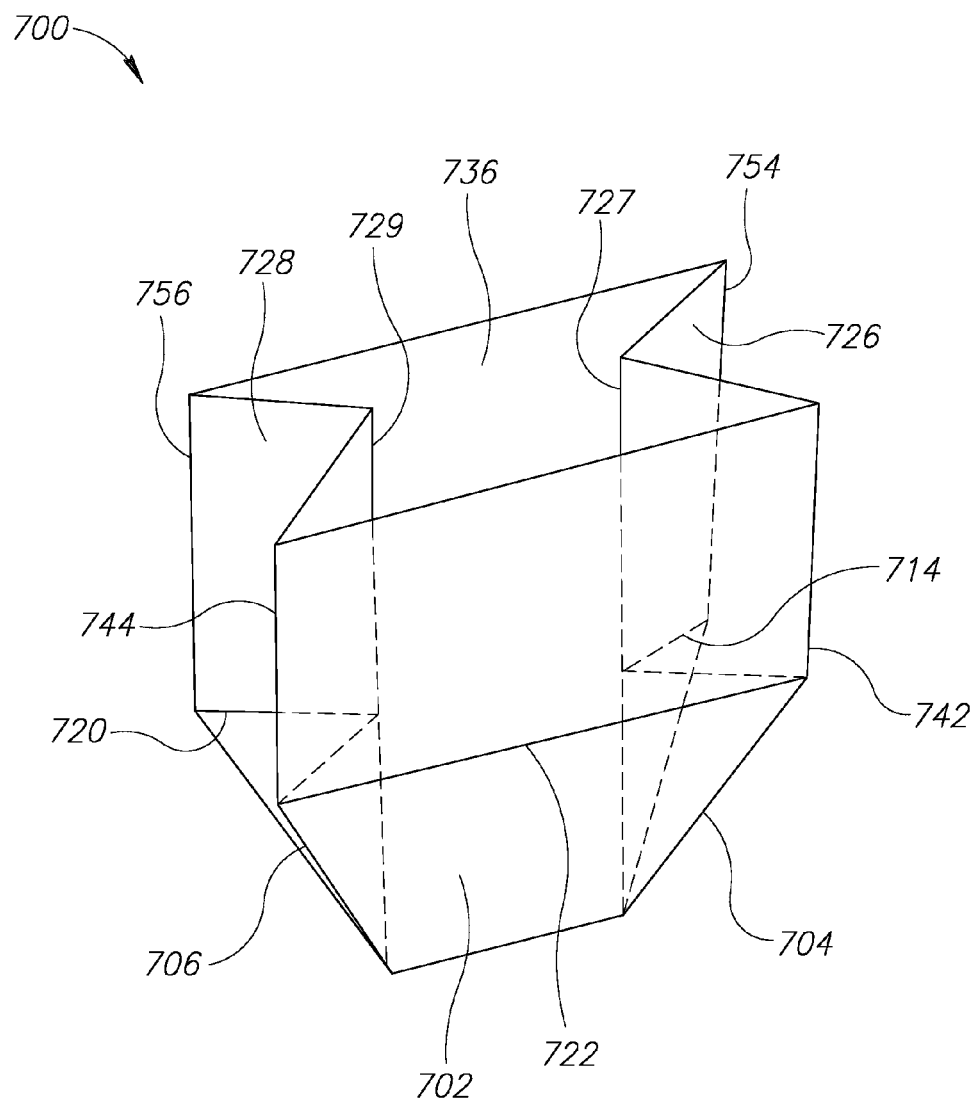
FIG. 6 shows a schematic view, in perspective, of a collapsed crate as described in WO 2011/055361 and used in the present invention.

Reference is now made to FIG. 6, which schematically shows a perspective view of collapsed crate 700, as described in WO 2011/055361. Collapsed crate 700 includes:

folded bottom panel 702 (similar to bottom panel 102 of FIGS. 1A and 1B and bottom panel 402 of FIG. 3, but in a folded position), folded along right set of collapsing lines 704 and left set of collapsing lines 706 (similar to right set of collapsing lines 104 and left set of collapsing lines 106 of FIGS. 1A and 1B and right set of collapsing lines 404 and left set of collapsing lines 406 of FIG. 3, but in a folded position);

front panel 734 and rear panel 736 (similar to front panel 134 and rear panel 136 of FIGS. 1A and 1B and front panel 434 and rear panel 436 of FIG. 3) but essentially adjacent to and overlapping each other;

right side panel 726 and left side panel 728 (similar to right side panel 126 and left side panel 128 of FIGS. 1A and 1B and right side panel 426 and left side panel 428 of FIG. 3), each folded along collapsing line 727 and collapsing line 729, respectively, (similar to collapsing line 127 and collapsing line 129 of FIGS. 1A and 1B and collapsing line 427 and collapsing line 429 of FIG. 3);

rear right (RR) foldable line 754 (similar to rear right (RR) foldable line 154 of FIGS. 1A and 1B and rear right (RR) foldable line 454 of FIG. 3), rear left (RL) foldable line 756 (similar to rear left (RL) foldable line 156 of FIGS. 1A and 1B and to rear left (RL) foldable line 456 of FIG. 3), front right (FR) foldable line 742 (similar to front right (FR) foldable line 142 of FIGS. 1A and 1B and to front right (FR) foldable line 442 of FIG. 3), and front left (FL) foldable line 744 (similar to front left (FL) foldable line 144 of FIGS. 1A and 1B and to front left (FL) foldable line 444 of FIG. 3), such that rear right (RR) foldable line 754 and front right (FR) foldable line 742 are essentially parallel and adjacent to each other, and rear left (RL) foldable line 756 and front left (FL) foldable line 744 are also essentially parallel and adjacent to each other; and four foldable edges: right foldable edge 714 (similar to right foldable edge 114 of FIGS. 1A and 1B), left foldable edge 720, (not shown, similar to left foldable edge 120 of FIGS. 1A and 1B), front foldable edge 722 (similar to front foldable edge 122 of FIGS. 1A and 1B), and rear foldable edge 724 (not shown, similar to rear foldable edge 124 of FIGS. 1A and 1B), wherein, right foldable edge 714 and left foldable edge 720 essentially form a V shape.

Collapsed crates 700, which are now reduced in volume, are then transferred by second conveyor assembly 210 to piling, storage, and/or shipment. Due to their reduced form, collapsed crates 700 can be conveniently piled at ease, stocked or shipped—and afterwards, prior to their use for packaging or carrying various objects, they can readily be reconstructed back to regular crates—manually or by using automated processes.

Furthermore, in view of what was described above while referring to the accompanying figures, any professional would understand that in the invention presented above, it is also described and assimilated an aspect of a general method for simultaneously collapsing and conveying collapsible cardboard crates. The method comprises the steps of: continuously feeding the collapsing assembly with constructed crates; and within the collapsing assembly, rotating the constructed crates by 90° such as to move the open face of the crate from upward facing to forward facing, conveying the crates and applying pressure on the two opposing side panels, such as to collapse the constructed crates along their collapsing lines.

The method may further comprise a step of applying pressure against a front panel or a rear panel of the collapsing crate in order to facilitate the collapsing of the constructed crate.

Therefore, in view of the preferred embodiment as described hereinabove, with reference to the accompanying figures, any professional will appreciate that the simultaneous and conveying collapsing assembly, for the collapsing and conveying of collapsible crates, and the method for simultaneously collapsing and conveying collapsible crates (as described), constitute an appropriate and innovative solution to the challenges of providing an efficient and uninterrupted collapsing assembly.

The invention has, so far, been described using various detailed descriptions of embodiments thereof that are provided by way of example and are not intended to limit the scope of the invention. The described embodiments might comprise different features, not all of which are required in all the variants of the invention. Some embodiments of the invention utilize only some of the features or possible combinations of the features. Variations of embodiments of the invention that are described and embodiments of the invention comprising different combinations of features noted in the described embodiments would occur to professionals skilled in the art. It to be noted that the scope of the invention is limited only by the claims and that the claims be interpreted to include all such variations and combinations.

The invention claimed is:

1. A collapsing assembly adapted to collapse constructed collapsible crates having a foldable bottom panel and right and left side foldable panels, along their collapsing lines, said collapsing assembly comprising:

a rotating means to rotate the constructed crates by 90° in a way that moves the open face of the crate from upward facing to forward facing towards a direction of conveyance; and a conveying and collapsing means configured to convey the crates in the direction of conveyance and apply pressure on the crates' two opposing side panels, as the crates are conveyed, thereby collapsing said constructed crates along their collapsing lines while the open faces of said crates are already forward facing towards the direction of conveyance.

2. The collapsing assembly of claim 1, wherein the conveying and collapsing means comprises two opposing rotating units provided with a plurality of fins, said two opposing rotating units forming an angle relative to each other to present a wider entrance for said crate into said rotating units than an exit for said crate, wherein a set of two opposing fins of the plurality of said fins contact the collapsing lines of said crate and exert a pressure on said collapsing lines causing the crate to collapse along its collapsing lines as it is simultaneously conveyed.

3. The collapsing assembly of claim 1, wherein said conveying and collapsing means further comprises a tunnel and fins provided on its two opposing substantially upright internal walls of said tunnel, said fins comprising a substantially horizontal member tapered so that the entrance to the tunnel is wider than the exit of the tunnel.

4. The collapsing assembly of claim 1, wherein said conveying and collapsing means further comprises two substantially upright members and fins provided on the two facing walls of said upright members, said fins comprising substantially horizontal members tapered towards each other in the direction of conveyance of said constructed collapsible crate.

5. The collapsing assembly of claim 1, wherein said conveying and collapsing means further comprises two members, a first part of said members being substantially upright, said first part of said members being attached to the outer edges of said conveying mechanism and a second part being substantially horizontal, said substantially horizontal parts being tapered towards each other in the direction of conveyance of said constructed collapsible crate.

6. The collapsing assembly of claim 1, wherein said conveying and collapsing means further comprises two substantially upright members provided on the outer edges of the conveying mechanism, and two substantially horizontal elongated members which taper towards each other in the direction of conveyance of said constructed collapsible crate.

7. A method for simultaneously collapsing and conveying constructed collapsible crates having a foldable bottom panel and right and left side foldable panels, said method comprises the steps of continuously feeding a conveying and collapsing assembly with constructed crates and within the conveying and collapsing assembly, rotating the constructed crates by 90° to move the open face of the crate from upward facing to forward facing towards a direction of conveyance while conveying the crates and applying pressure on the two opposing side panels, thereby conveying and collapsing the constructed crates along their collapsing lines simultaneously while the open faces of said crates are already forward facing towards the direction of conveyance.

8. The method of claim 7, further comprising a step of applying pressure against a front panel or a rear panel of the collapsing crate in order to facilitate a collapsing action of said constructed crate.

9. A collapsing assembly adapted to collapse constructed collapsible crates along their collapsing lines, said collapsing assembly comprising:
a rotating means to rotate the constructed crates by 90° in a way that moves the open face of the crate from upward facing to forward facing towards a direction of conveyance; and
a conveying and collapsing means configured to convey the crates in the direction of conveyance and apply pressure on the crates' two opposing side panels, as the crates are conveyed, thereby collapsing said constructed crates along their collapsing lines while the open faces of said crates are already forward facing towards the direction of conveyance;
wherein the conveying and collapsing means further comprises two substantially upright members provided on the outer edges of the conveying mechanism, and two substantially horizontal elongated members which taper towards each other in the direction of conveyance of said constructed collapsible crate.

10. The collapsing assembly of claim 9, wherein the two substantially upright members and two substantially horizontal elongated members comprises two opposing rotating units provided with a plurality of fins, said two opposing rotating units forming an angle relative to each other to present a wider entrance for said crate into said rotating units than an exit for said crate; wherein a set of two opposing fins of the plurality of fins contact the collapsing lines of said crate and exert a pressure on the collapsing lines causing the crate to collapse along its collapsing lines as it is simultaneously conveyed.

11. The collapsing assembly of claim 9, wherein the two substantially upright members and two substantially horizontal elongated members comprise a tunnel and fins provided on its two opposing substantially upright internal walls of said tunnel, said fins comprising the two substantially horizontal elongated members, tapered such that the entrance to the tunnel is wider than the exit of the tunnel.

12. The collapsing assembly of claim 9, wherein the two substantially horizontal elongated members further comprise a plurality of fins provided on the two facing walls of said two substantially upright members, said fins being tapered towards each other in the direction of conveyance of said constructed collapsible crate.

13. The collapsing assembly of claim 9, wherein the two substantially upright members are attached to the outer edges of said conveying mechanism and the two substantially horizontal elongated members are tapered towards each other in the direction of conveyance of said constructed collapsible crate.

* * * * *